United States Patent [19]

Jolissaint

[11] 4,163,124
[45] Jul. 31, 1979

[54] FINITE STORAGE-TIME QUEUE

[75] Inventor: Charles H. Jolissaint, Sunnyvale, Calif.

[73] Assignee: Rolm Corporation, Santa Clara, Calif.

[21] Appl. No.: 927,185

[22] Filed: Jul. 24, 1978

[51] Int. Cl.² .............................................. H04Q 3/64
[52] U.S. Cl. ................................................... 179/18 D
[58] Field of Search ............................ 179/18 D, 27 D

[56] References Cited

U.S. PATENT DOCUMENTS

| 3,588,369 | 6/1971 | Lee et al. | 179/18 D |
| 3,660,612 | 5/1972 | Schluter et al. | 179/18 D |
| 4,048,452 | 9/1977 | Oehring et al. | 179/27 D |

Primary Examiner—William C. Cooper
Attorney, Agent, or Firm—Townsend and Townsend

[57] ABSTRACT

A queuing technique for message communication systems having a plurality of caller handsets and multiple tariff communication links.

In response to toll call requests, the lowest tariff links are scanned for availability. If no such link is available, a request is stored in a finite time, fixed storage queue, and the lowest tariff links are repeatedly scanned for availability. If no such link becomes available within a predetermined maximum time period, or if the number of requests stored in the queue exceeds a predetermined maximum number, the next lowest tariff links are scanned and the caller handset corresponding to the oldest stored request is connected to an available one of such links. If none of the next lowest tariff links are available, the oldest caller is connected to one of the regular tariff links.

A second queue may be added between the next lowest tariff link group and the regular tariff link group to provide serial tandem queues or serial concatenated queues.

16 Claims, 8 Drawing Figures

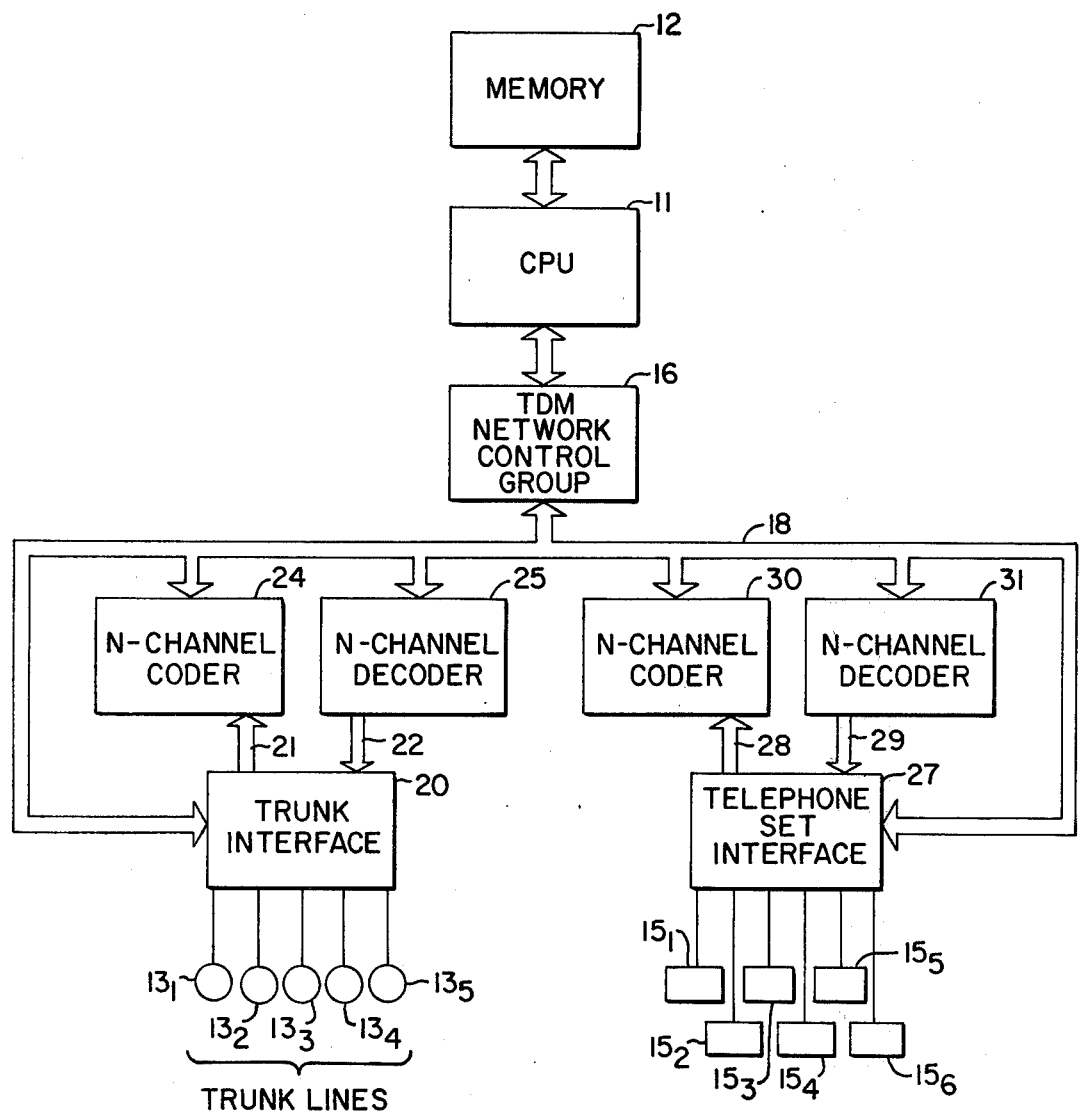
FIG._1.

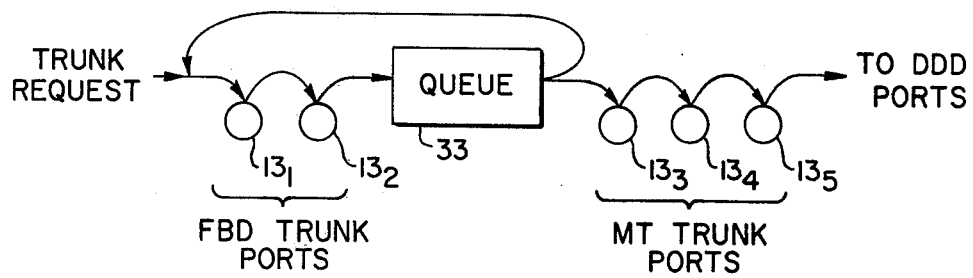
FIG._2.
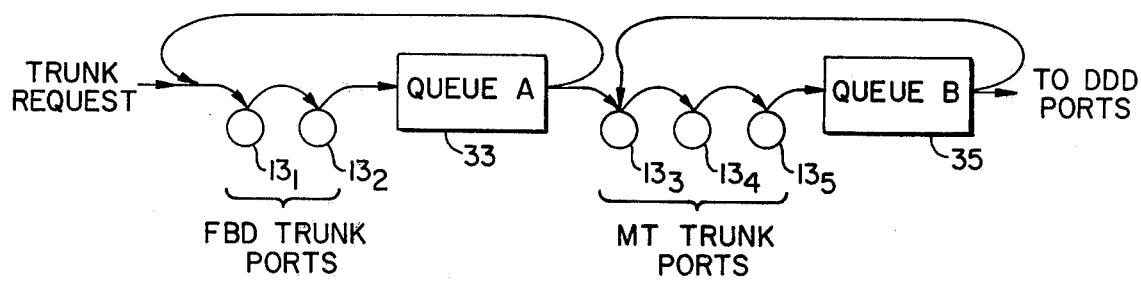
FIG._5.
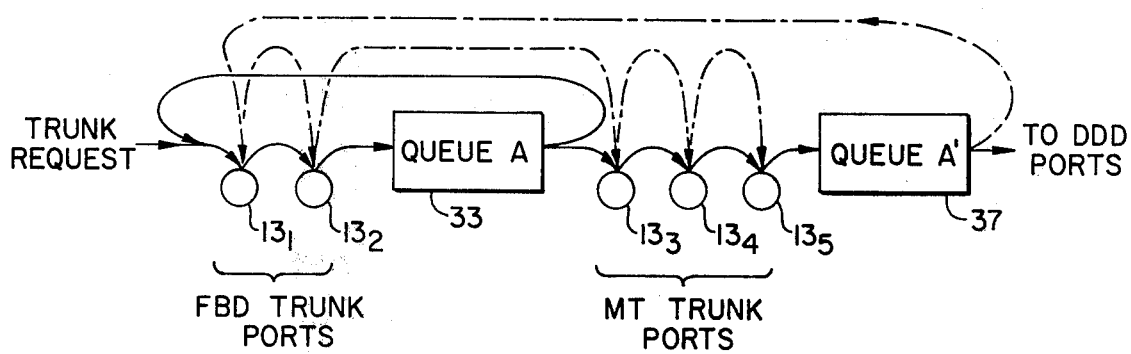
FIG._7.

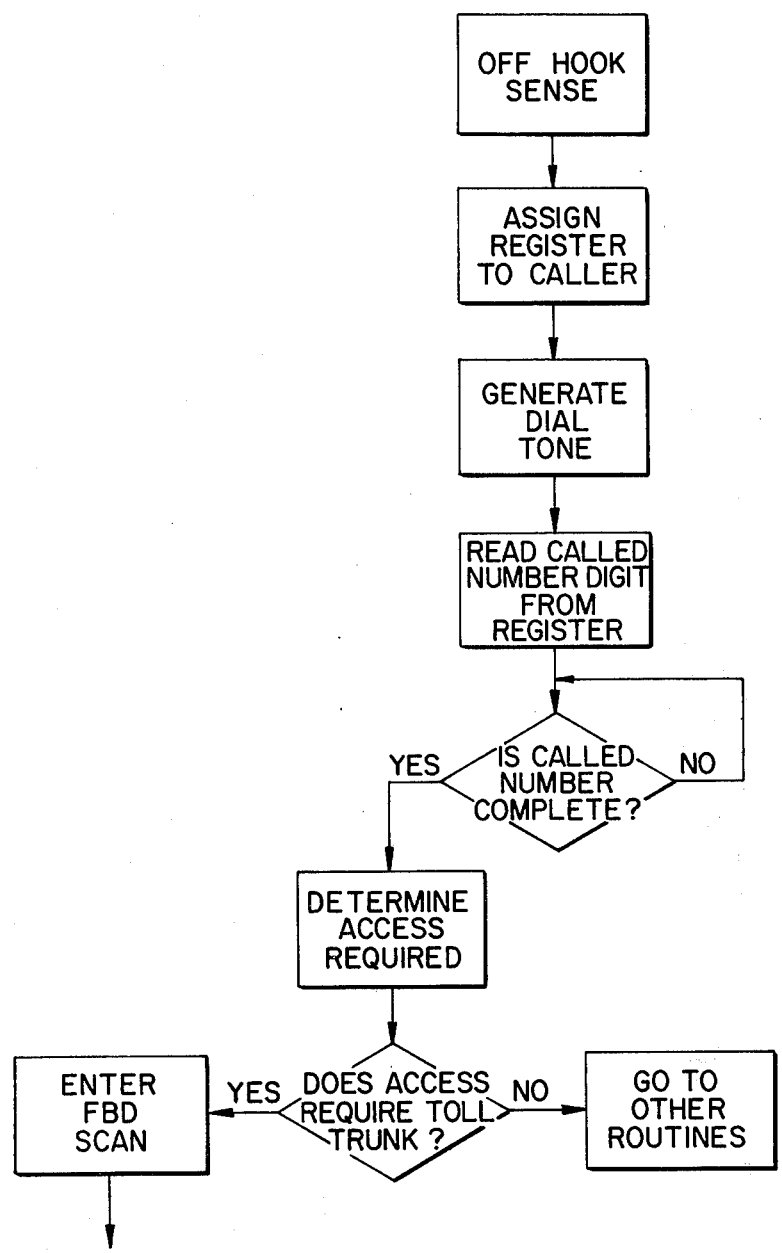
FIG._3.

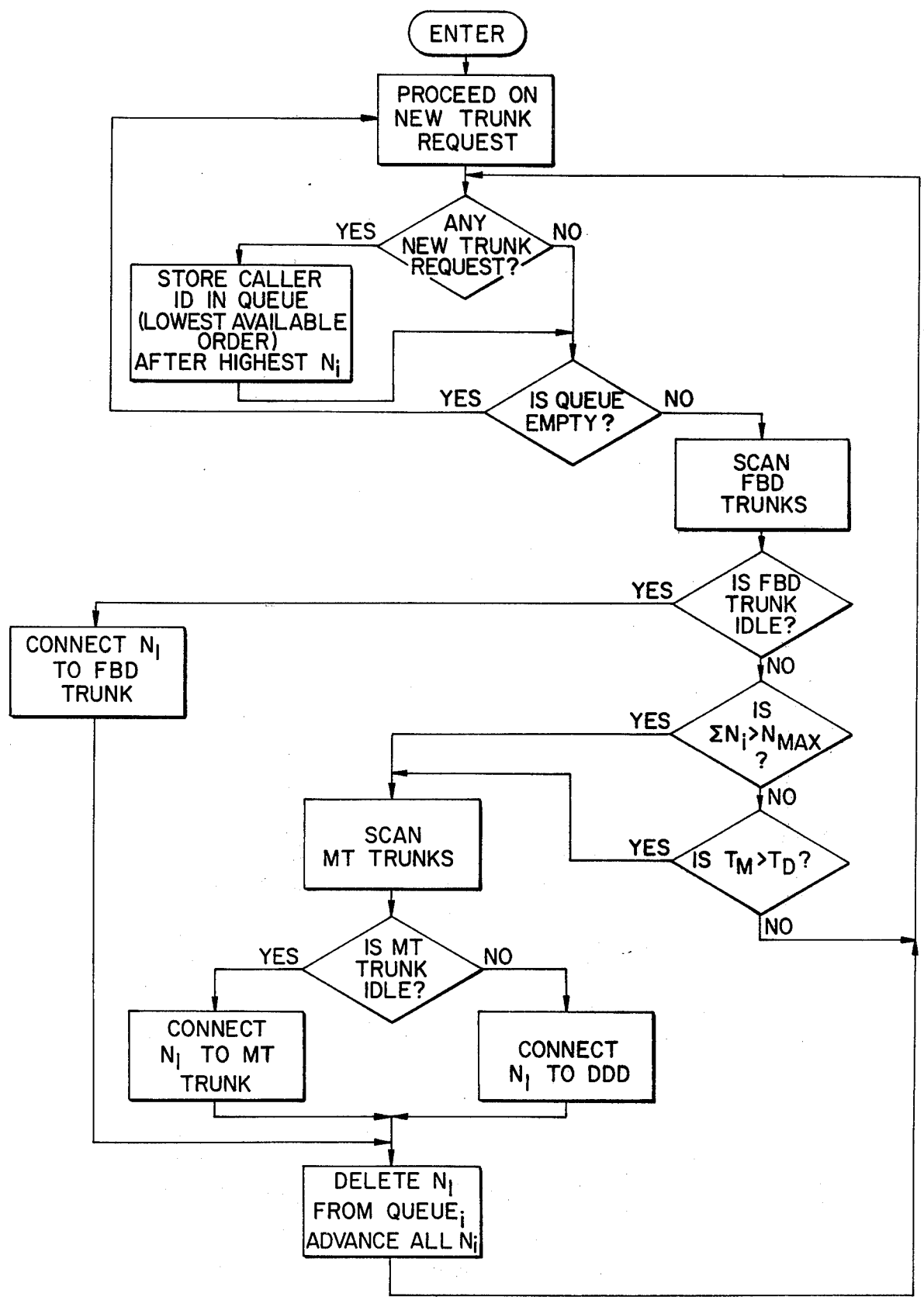
FIG._4.

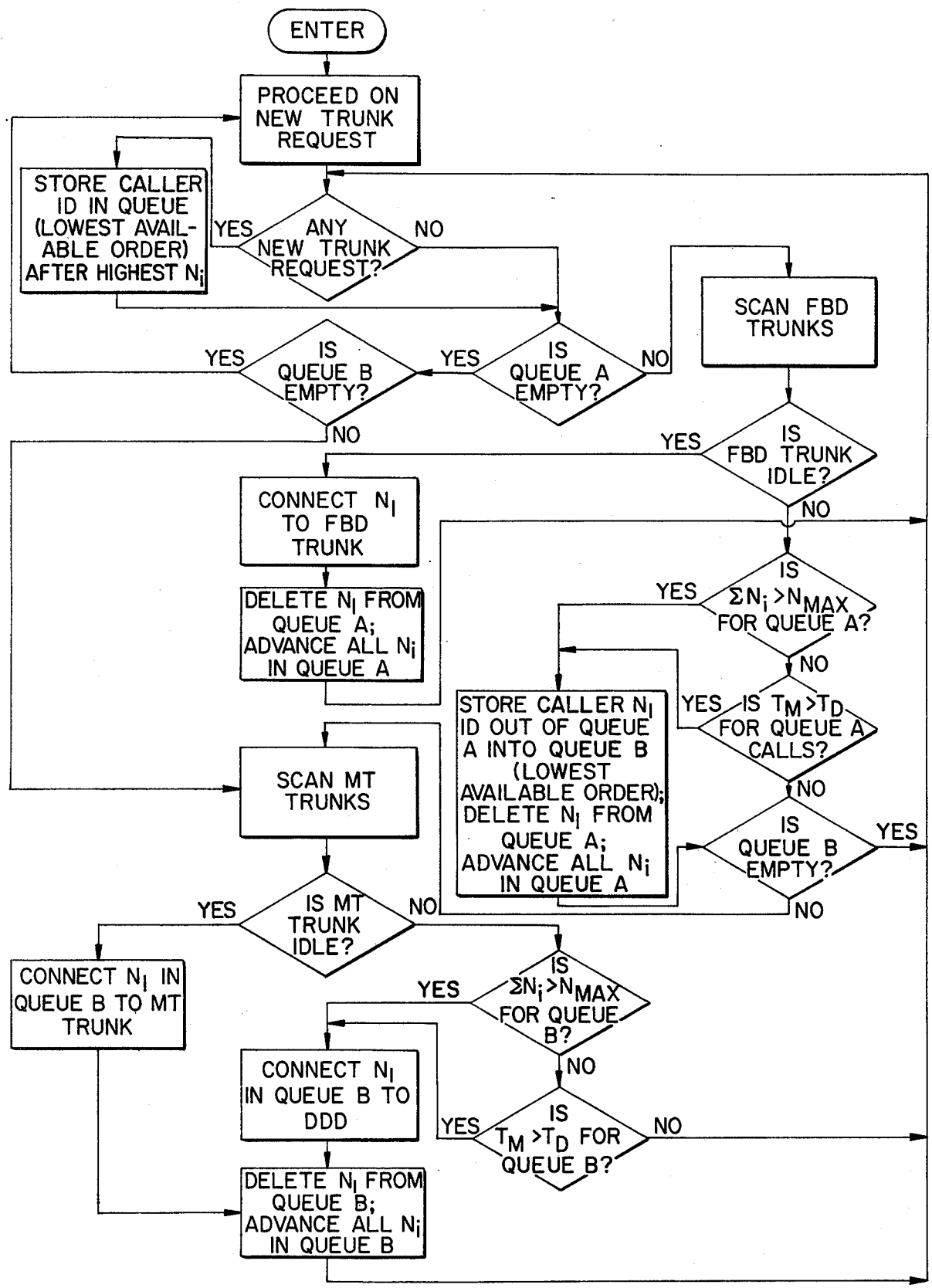
FIG._6.

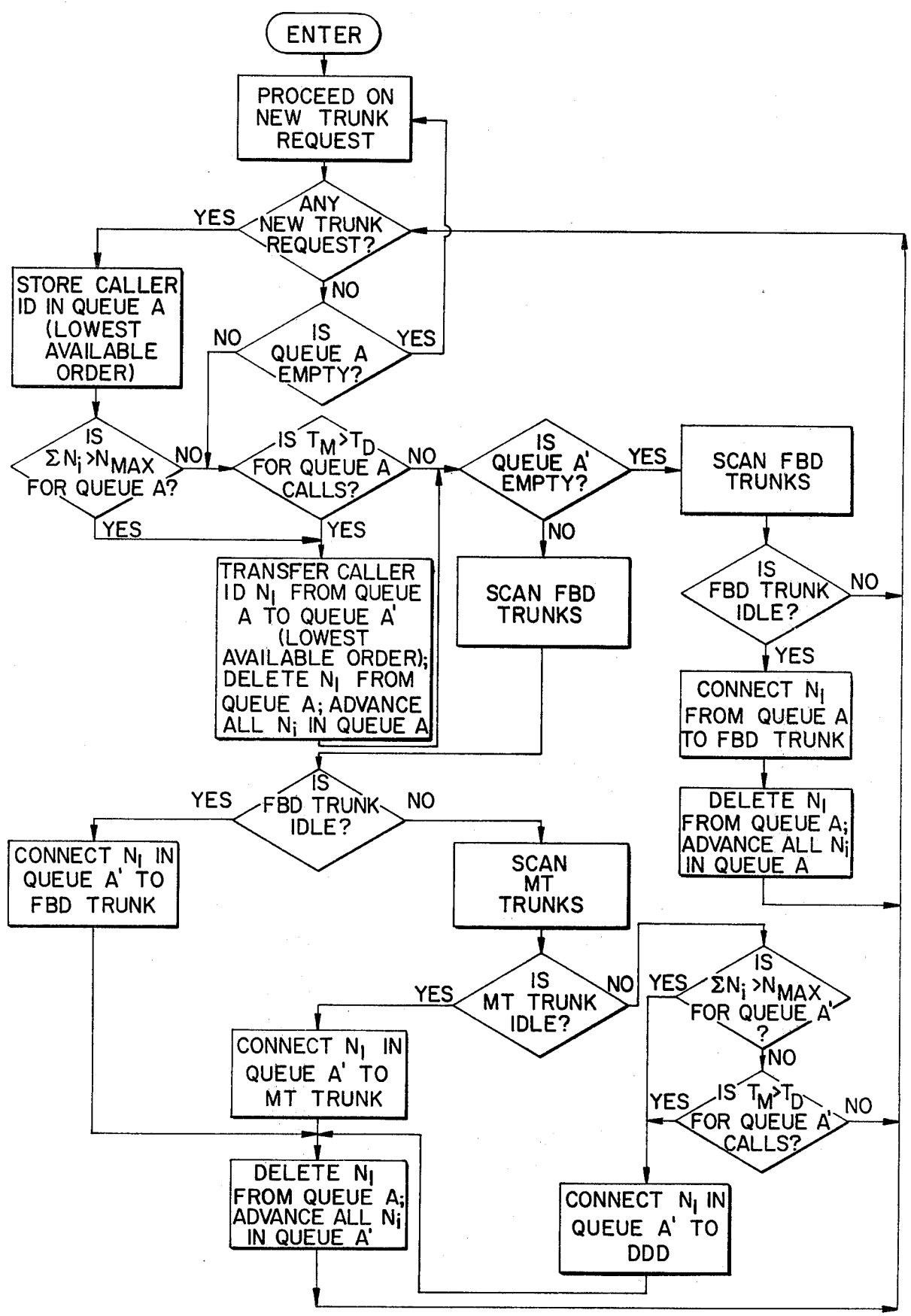
FIG._8.

FINITE STORAGE-TIME QUEUE

BACKGROUND OF THE INVENTION

This invention relates to information signal communications systems, particularly telephone systems, employing a queuing feature.

In many information signal communication systems, particularly in telephone switching communication systems, several communication links are provided which are accessible to individual calling stations and which are grouped in different tariff or toll classes. For example, in the United States the Bell System provides communication links termed "trunk lines" of different classes which are leased at different rates, depending on the class. Specifically, Full Business Day (FBD), Wide Area Telephone System (WATS) trunk lines are available at one tariff schedule, measured time (MT) WATS trunk lines are available at a different tariff schedule, and Direct Distance Dialing (DDD) trunk lines are available at still another tariff schedule. The effect of such alternative tariff schedules is to reduce communication costs per call as the utilization of these trunk lines increases through the proper selection of trunk lines. The consequent motivation has been to load least expensive trunks and achieve cost savings as fully as possible subject to tolerable delays and inconveniences on the part of the user. In order to achieve higher utilization and consequent cost savings on less expensive communication links, e.g., the FBD WATS trunks, than a more expensive class of communication lines, e.g., the MT WATS trunk lines, such communications systems typically include a provision for automatically scanning FBD trunks first when a long distance call or non-local call is dialed by a calling station user associated to a particular communication switching system. In the case of telephones, for example, the telephone switchboard through which a caller's telephone is to be switched to the trunk lines performs this function.

An early type of scanning employed in telephone switching systems, termed "toll restriction without queuing" proceeds as follows. In response to the dialing of a non-local (long distance) telephone number by a caller, the switchboard circuitry scans the different groups of trunk lines in accordance with their tariff classes in accordance with a priority scheme, with the lowest tariff group of trunk lines being scanned first, the next lowest tariff class being scanned next, etc. The calling station is connected to the first available trunk encountered. Should the scanning circuitry determine the unavailability of any trunk line in any of the special lower tariff class groups, a busy signal is generated requiring the calling party to hang up and redial. As a specific example, in a telephone switching system having access to FBD and MT WATS trunk lines, and DDD trunk lines, the switchboard scans the FBD and MT WATS trunk lines only and generates a busy signal if no trunk in either of these two groups is available. This scanning suffers from the disadvantage that the accessibility of the WATS trunk lines decreases directly with increasing number of requests for access to such trunk lines, requiring frequent redialing during heavy periods of traffic and affording only random access to the lower tariff WATS trunk lines.

Due to the disadvantages of the "toll restriction without queuing" scanning technique, a more refined scanning system termed "toll restriction queuing," was developed. In this type of scanning system, scanning of the lower tariff class trunk lines initially proceeds in the manner noted above for "toll restriction without queuing." However, an unsuccessful scan, i.e., a scan during which no unoccupied FBD or MT WATS trunk line is available, results in the storage of a signal identifying the calling station desiring access to a lower tariff trunk line in a first-in, first-out (FiFo) storage device. Thereafter, the telephone switching equipment continuously scans the FBD and MT WATS trunk lines sequentially until a lower tariff trunk line becomes available, whereupon the calling station corresponding to the oldest identification signal stored in the FiFo is connected to the first available trunk line. Although the "toll restriction queuing" scanning technique frees the calling party from the necessity of frequent redialing in order to establish a lower tariff trunk line connection, in operation such a system introduces a delay in obtaining a trunk line connection (and thus in completing a long distance call) which is directly dependent upon the amount and number of such requests. Stated otherwise, the delay encountered in such a system is directly dependent upon the amount of traffic. Large traffic fluctuations in the system can still cause an inordinate wait and user inconvenience.

In order to limit the waiting period inherent in the "toll restriction queuing" technique, a further scanning improvement, termed "fixed time queuing," was developed. According to this scanning technique, the switching equipment initially scans the lower tariff trunk lines in a manner similar to that noted above, i.e., from highest priority to lowest priority class, in order to determine the availability of a lower tariff trunk line. If no available trunk is found during the scan, the calling station identification signal is stored in a fixed time queuing device, and the switching equipment continues to scan the grouped lower tariff trunk lines repetitively until a lower tariff trunk line becomes available. Should no lower trunk line become accessible within a predetermined maximum period of time, the calling station is connected automatically to a DDD trunk line and the call is then placed at regular rates. This scanning technique achieves cost savings by delaying traffic up to some maximum period of time before finally using more expensive DDD trunk lines in an attempt to seize the less expensive trunks. In a variation of the "fixed time queuing" technique, a second fixed time queue is inserted in the scanning chain downstream of the first fixed time queing device, typically between the last trunk line in the highest priority class and the first trunk line in the next highest priority class. In this arrangement, each unsuccessful scan of the highest priority trunk group causes the caller's identification number to be temporarily stored in the intermediate fixed time queue for a short period of time (e.g., 20 seconds), after which the caller'identification is retrieved and caused to scan the next highest priority trunk group. Should this scan be unsuccessful, the caller's identification is simply stored in the fixed time queue as noted above, with similar results. The intermediate fixed time queue gains economic savings over the single fixed time queue because of additional cost savings obtained by shifting traffic between the intermediate and the least expensive trunk lines in the group. However, daily traffic fluctuations often exceed the capacity of the least expensive trunk group, causing a considerable number of calls to have to overflow this intermediate fixed time queue in practical systems. During heavy periods of long distance traffic requests, the intermediate queue can get very large and many callers are unnecessarily required to wait until the predetermined time out period before gaining access to the next highest priority trunk group. Therefore, the maximum period of time specified for this intermediate queue must be chosen to be a small tolerable value. Having a small period of maximum wait in this intermediate queue restricts the cost savings which are achievable in practical communication systems.

SUMMARY OF THE INVENTION

The invention comprises a method and system for queuing communication link requests from calling stations in any communication system having priority grouped communication links, particularly communications networks in which the different classes of links are grouped on the basis of differential toll service, and which enables an extremely efficient economic use of differently priced groups of communication links while providing a minimum access time delay for a calling party. Further, the invention automatically adapts to varying traffic conditions in such a manner as to maximize usage of highest priority class communication links during low traffic periods, while minimizing the access time delay during periods of heavy traffic.

In the most general aspect of the invention, serially generated communication link requests from a plurality of calling stations are sensed by first sensing means, while a first scanning means scans the highest priority group of communication links to determine the availability of a communication link in this group for connection. When an available communication link in the first group is detected, a first switching means connects the calling station associated to a given request signal to that link. When none of the communication links in the first group is found available, each successively generated request signal is stored in a first queuing means for a predetermined maximum time period or until a link in the first group becomes available. In addition, the number of request signals stored in the first queuing means is monitored. A second scanning means scans the next highest priority group of communication links to determine availability of a link therein when a request signal has been stored in the first queuing means for the maximum time period or the number of request signals stored in the first queuing means exceeds a predetermined maximum number. When the second scanning means locates an available link in the second group, second switching means connects the calling station associated to the oldest request signal stored in the first queuing means to the available link in the second group.

In an alternate embodiment of the invention, a third scanning means is provided for scanning a third group of communication links for availability of one of the links therein when the second scanning means determines the unavailability of any of the communication links in the second group, and third switching means connects the calling station associated to the oldest request signal to the available one of the communication links in the third group. In a further alternate embodiment of the invention, second queuing means is provided for storing unconnected request signals for a second fixed time period when the second scanning means determines that none of the communication links in the second group is available. The first and subsequent serial queues can be related as a serial tandem queue (each queue is for a set of independent trunk lines) or serial concatenated queues (each subsequent queue includes the trunk lines of the previous queues) or any partial combination or variation thereof.

In a telephone switching system embodiment of the invention, the first, second, third and subsequent groups of communication links comprise different tariff classes of trunk lines, such as FBD WATS trunk lines, MT WATS trunk lines, DDD trunk lines, Foreign Exchange (FX) trunk lines and inter-system tie lines, respectively.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a block diagram of a telephone switching system embodying the invention;

FIG. 2 is a schematic diagram illustrating a first embodiment of the inventive queuing technique;

FIG. 3 is a flow chart illustrating the trunk request routine of the system of FIG. 1;

FIG. 4 is a flow chart of the queuing routine performed by the system of FIG. 1 and corresponding to the FIG. 2 queuing technique;

FIG. 5 is a schematic diagram illustrating an alternate embodiment of the inventive queuing technique using serial tandem queues;

FIG. 6 is a flow chart corresponding to the FIG. 5 queuing technique;

FIG. 7 is a schematic diagram illustrating an alternate embodiment of the inventive queuing technique using serial concatenated queues; and FIG. 8 is a flow chart corresponding to the FIG. 7 queuing technique.

DESCRIPTION OF THE PREFERRED EMBODIMENTS

Turning now to the drawings, FIG. 1 illustrates a computer-controlled telephone switching system embodying the invention. As seen in this Fig., a central processing unit 11 under control of a program stored in a memory unit 12 controls the switching interconnections between a plurality of trunk lines $13_i$ and a plurality of telephone handsets $15_i$ via a digital network control group 16 and a digital bus 18. Each trunk line $13_i$ is coupled via a trunk interface unit 20 and a pair of multiconductor paths 21, 22 to a coder 24 and a decoder 25. Similarly, each telephone set $15_i$ is coupled via a telephone set interface 27 and a pair of multiconductor paths 28, 29 to a coder 30 and a decoder 31.

While the invention may be embodied in a wide variety of different communication systems involving priority switching between calling stations and communication links, the system shown in FIG. 1 comprises a time division multiplexed computer-controlled private branch exchange, known in the trade as a computerized branch exchange (CBX) in which analog signals appearing at trunk interface 20 or telephone set interface 27 are converted to digital form by coders 24, 30, respectively and routed in digital form to an appropriate decoder 25, 31, in which the digital signals are converted back to analog form and coupled via trunk interface 20 and telephone set interface 27 to the appropriate trunk line $13_i$ and telephone set $15_i$, all under control of a time division multiplexed network control group 16. The time division multiplexed network control group 16 is in turn controlled by the central processing unit 11 in accordance with a program stored in memory unit 12. One such system of the type shown in FIG. 1 is the ROLM CBX available from Rolm Corporation of Santa Clara, Calif. Other systems of the same general type will occur to those skilled in the art.

Data bus 18 provides a multiconductor conduction path for both digital information signals (e.g., voice signals generated by telephone sets $15_i$); multibit digital address signals identifying specific trunk lines, telephone sets $15_i$, and individual channels; and timing and control signals for directing sequential operation of the interface units 20, 27, the coders 24, 30 and the decoders 25, 31. Since the specific construction of the system shown in FIG. 1 is not essential to an understanding of the invention, further description thereof is omitted to avoid prolixity.

General operation of the FIG. 1 system proceeds as follows. When a caller wishes to place a call from one of the telephone sets $15_i$ to an outside party, placing one of the telephone sets $15_i$ in the off-hook condition results in the generation of a dial tone signal by the TDM network control group 16. Upon receipt of the dial tone, the calling party dials the outside number and the particular telephone set $15_i$ is connected to a given trunk line $13_i$ by the TDM network control group 16 establishing a voice path between the receiver $15_i$ and the seized trunk $13_i$ via one channel of the coders 24, 30 and decoders 25, 31. Voice signals from the calling party's telephone set $15_i$ are coupled via the telephone set interface 27 to the corresponding channel of coder 30, are converted to digital form and routed over data bus 18 to the corresponding channel of decoder 25, converted in decoder 25 to analog form and coupled via trunk interface 20 to the seized trunk line. Responsive voice messages incoming on the seized trunk line $13_i$ are coupled via trunk interface 20 to the corresponding channel of coder 24, are converted by coder 24 from analog to digital form and routed via data bus 18 to the corresponding channel of decoder 31, are converted from digital to analog form by decoder 31 and coupled via telephone set interface 27 to the calling party's telephone set.

With reference to FIG. 2, when one or more calling parties dial a toll number, such as a long distance ten digit telephone number, the interconnection between the calling party's telephone set $15_i$ and the trunk lines $13_i$ proceeds according to the invention in the following manner. Each trunk line, which may be considered to be an exit port from the CBX, is grouped in a particular priority class by appropriate address signals on data bus 18, and priority between classes or groups is established in a predetermined manner in accordance with the measured tariff assigned to a particular trunk line. Thus, as shown in FIG. 2, trunks $13_1$ and $13_2$, the highest priority trunks, may be FBD WATS trunk lines, while trunk lines $13_3$, $13_4$, and $13_5$, the next highest priority trunk lines, may be MT WATS trunk lines. When a trunk request signal is generated by placing a particular telephone set $15_i$ off hook and dialing the number requested, the highest priority trunk lines capable of connecting this call, e.g., $13_1$ and $13_2$ are first scanned for availability in succession. If either of these FBD trunk lines are available, the requesting telephone set $15_i$ is connected thereto by the TDM network control group 16 and the call is placed. If neither FBD trunk is available at that time, a request signal identifying the requesting telephone set $15_i$ is stored in queuing device 33 along with the phone number desired, and scanning of the FBD trunk lines continues. Queuing device 33 provides storage for a predetermined finite number of identifying request signals each for a predetermined maximum period of time. Additionally, whenever an identifying request signal is stored in queue 33, scanning of the FBD trunk lines continues and, if one of the FBD trunk lines becomes available, the telephone set $15_i$ associated to the oldest stored identifying request signal in queue 33 is connected by the TDM network control group 16 to the available FBD trunk line.

Queue 33 overflows in the manner described below upon occurrence of one of two conditions. Firstly, if the total number of identifying request signals stored in queue 33 exceeds a predetermined maximum number, the next highest priority group of trunk lines (e.g., the MT trunk lines $13_3$–$13_5$) is successively scanned by the TDM network control group 16 to determine whether one of this class of trunk line is available for connection. If an available MT trunk line is sensed, the telephone set $15_i$ corresponding to the oldest stored identification signal in queue 33 is connected to the available trunk line. Secondly, if the time period during which any given identification signal has remained in queue 33 exceeds a predetermined maximum time period (which will always occur at any moment for only the oldest stored identification signal in queue 33), the MT trunk lines are also scanned and the corresponding telephone set $15_i$ is connected to an available MT trunk line. If none of the MT trunk lines are available after one scan, the telephone set $15_i$ corresponding to the oldest stored identification signal is coupled to a DDD trunk line and the connection is completed.

Thus, once a trunk request is made by a given telephone set $15_i$, the maximum waiting time for the calling party is the delay time provided by queue 33 plus the time required for the system of FIG. 1 to scan first the FBD trunk lines $13_1$, $13_2$ and the MT trunk line group $13_3$–$13_5$. It should be noted that the total combined scanning times for all trunk lines is typically of the order of a few milliseconds and is therefore negligible when compared to the time out period provided by queue 33 which may be on the order of 20 seconds.

Queue 33 may comprise any one of a number of known devices, such as a multiple stage digital register for storing the identification signals, a counter for keeping track of the number of identification signals stored in the register, and a plurality of one-shot circuits for monitoring the individual store times of the respective identification signals. Queue 33 may also be incorporated into the central processing unit 11 and memory 12, with the identification signals being stored in preselected portions of memory 12 blocked into registers and the counting and timing functions being performed by appropriate elements of the central processing unit 11. Equivalent arrangements will occur to those skilled in the art.

FIG. 3 is a flow chart illustrating the trunk request routine performed by the system of FIG. 1 under control of a program stored in memory 12. The TDM network control group 16 continuously scans the telephone sets $15_i$ for an off-hook signal. When an off-hook signal has been sensed, a register is assigned to the telephone set $15_i$ which generated the off-hook signal. After the register assignment, a dial tone signal is generated and coupled to the off-hook telephone set $15_i$, whereupon the caller dials a multidigit telephone number which is translated into a binary representation in the assigned register and transferred to the CPU. When the dialed number is recognized by the CPU as complete, the completed multidigit called number is examined by the CPU to determine the type of line access required. As will be apparent to those skilled in the art, the calling party may have dialed one of several different types of numbers, such as the switchboard operator, another telephone set $15_i$ connected to the CBX, a number signifying a special feature (e.g., paging by an intercom) or a number requiring a toll trunk. In all but the last case, the system will enter the appropriate one of other specific routines to accomplish the requested service. However, if the dialed number requires connection to a toll trunk line, the system will enter the scan routine illustrated in the flow chart of FIG. 4.

With reference to FIG. 4, upon entry into the scan routine, a check is periodically made to identify a new trunk request, i.e., originating from a telephone set $15_i$ which has just been placed off hook. If not, an examination is made of queue 33 to determine whether the queue is empty of any identification signals. If so, the system returns to the starting point of the scan routine and awaits a new trunk request.

Upon receiving a new trunk request, the identification signal for the corresponding telephone set $15_i$ is stored in queue 33 after any previous entry. The FBD trunks are then scanned to determine if any trunks are idle and therefore available. If an available FBD trunk is found, the telephone set $15_i$ corresponding to the oldest identification signal $N_1$ stored in queue 33 is connected to the available FBD trunk and removed from queue 33. If no FBD trunks are idle, the number of identification signals stored in queue 33 is examined to determine whether this number exceeds the maximum permitted number of such signals. If so, the MT scan subroutine is entered. If not, the time out circuits associated to the individual stages of queue 33 are examined to determine whether any identification signal has been stored in queue 33 for a period of time greater than the maximum time period $T_d$. If so, the MT scan subroutine is entered. If not, the system returns to determine if any new trunk requests have occurred and follows the flow path described above.

Whenever the total number of identification signals stored in queue 33 exceeds the maximum predetermined number $N_{max}$ or one of the identification signals $N_i$ is stored for a longer period than $T_d$ scanning of the MT trunks commences. If an idle MT trunk is found, the telephone set $15_i$ corresponding to the oldest identification signal $N_1$ stored in queue 33 is connected to the available MT trunk. If no MT trunk is idle, the same telephone set $15_i$ is connected to a DDD trunk line. Upon occurrence of either connection, the identification signal $N_1$ is deleted from queue 33, and all of the $N_i$ are advanced in order. Thus, the contents of $N_2$ are advanced to $N_1$, the contents of $N_3$ are advanced to $N_2$, etc., and the system returns to see if there are any new trunk requests.

FIG. 5 schematically illustrates a first alternate embodiment of the invention described above using serial tandem queues. As seen in this figure, a second queue 35 is provided for storing identification signals in a first-in, first-out (FiFo) arrangement after the MT trunk lines $13_3$–$13_5$ have been unsuccessfully scanned (i.e., scanning of the MT trunk lines has resulted in a determination that no trunk lines are available). Queue 35 functions as a buffer between not-yet connected telephone sets $15_i$ and the DDD trunk lines and may be employed to increase subsequent utilization of the MT trunks using calls which overflow queue 33 due to the finite storage constraint and which have not yet exceeded the maximum allowable wait time. The flow chart for the program routine executed by the embodiment of FIG. 5 is shown in FIG. 6.

FIG. 7 illustrates a second alternate embodiment of the invention employing concatenated queuing illustrated as using a second queue 37 to provide additional scanning of queued telephone sets $15_i$. In this embodiment, queue 37 provides fixed time storage for unconnected telephone sets $15_i$ resulting from an unsuccessful scan of both the highest priority FBD trunk lines $13_1$, $13_2$ and the next highest priority MT trunk lines $13_3$–$13_5$. When an identification signal is stored in queue 37, an additional scan subroutine is entered, depicted in phantom line, which has priority over the scanning routine depicted in solid line, the latter being identical to that described above with reference to FIGS. 2 and 4. More specifically, in response to the storage of an identification signal in queue 37, the FBD trunk line group is scanned in succession, followed by scanning of the MT trunk line group on a repeated basis until either a trunk line is found available or a predetermined time period has expired. If the priority scan subroutine is successful, the identification number is deleted from queue 37. If unsuccessful for the time out period provided by queue 37, the telephone set $15_i$ corresponding to the identification signal stored in queue 37 is connected to a DDD trunk line. In operation, queue 37 behaves like a concatenation of queues 36 and 37 in regard to the scanning of FBD trunk lines $13_1$, $13_2$ and the next highest priority MT trunk lines $13_3$–$13_5$. A flow chart illustrating the program routine for the embodiment of FIG. 7 is shown in FIG. 8.

While the preferred embodiments have been described with reference to a computer controlled telephone switching system, it will be apparent to those skilled in the art that the invention may be applied to a wide variety of information signal communication systems in which differential tariff classes of communication links are available and in which priority switching and queuing are desirable features. When employed in such systems, the communication traffic flow varies with the volume of toll link requests. Thus, during periods of light traffic, the use of the highest priority (lowest tariff) link group is maximized by virtue of the finite number store provided by queue 33. Conversely, during heavy demand periods, full utilization of all classes of communication links is ensured by the fixed time period storage afforded by queue 33. Stated differently, under light loads the lowest tariff trunk lines are heavily loaded with calls being held in queue 33 to ensure heavy loading; under heavy loads the queue 33, because of finite storage overflow, "flushes" rapidly so that prospective calls are delayed by a reduced average wait time period. The total effect is to provide more uniform service throughout the day which is less affected by actual traffic levels and to provide high utilization of the low tariff lines. The actual value of the time out period provided by queue 33, as well as the finite storage capacity of queue 33, will vary with specific applications, and can best be determined by examining certain parameters, such as the expected or actual average variation of communication traffic over a working period, the maximum tolerable access time period to a trunk line, the number of different classes of communication links available, the number of individual links for each particular class or group, and the like.

While the above provides a full and complete disclosure of the preferred embodiments of the invention, various modifications, alternate constructions and equivalents may be employed without departing from the true spirit and scope of the invention. Therefore, the above description and illustrations should not be construed as limiting the scope of the invention which is defined by the appended claims.

What is claimed is:

1. A method of queuing a plurality of serially generated communication link requests in a communication system having a plurality of calling stations and ordered groups of communication links, each group having a different priority level, said method comprising the steps of:
   (a) sensing each of a plurality of serially generated communication link requests from a plurality of calling stations;
   (b) scanning a first group of said communication links for availability of one of the communication links therein in response to said step of sensing;
   (c) connecting the calling station associated to a given request to one of said communication links in said first group, if available;
   (d) queuing said requests for a first fixed time period if none of said communication links in said first group is available during said step (b) of scanning;
   (e) repeating said step (b) of scanning and said step (c) of connecting;
   (f) sensing the number of requests queued;
   (g) scanning a second group of said communication links for availability of one of the communication links therein when a request has been queued for said first fixed time period or the number of queued requests exceeds a first predetermined maximum; and
   (h) connecting the calling station associated to the oldest queued request to one of said communication links in said second group.

2. The method of claim 1 further including the steps of:
   (i) scanning a third group of communication links for availability of one of the communication links therein if none of said communication links in said second group is available during said step (g) of scanning; and
   (j) connecting the calling station associated to the oldest request to one of said communication links in said third group.

3. The method of claim 1 further including the steps of:
   (k) additionally queuing for a second fixed time period each request remaining unconnected after said step (g) of scanning; and
   (l) repeating said step (g) of scanning and said step (h) of connecting.

4. The method of claim 3 further including the steps of:
   (m) scanning a third group of communication links for availability of one of the communication links therein when a request has been additionally queued for said second fixed time period; and
   (n) connecting the calling station associated to the oldest additionally queued request to one of said communication links in said third group.

5. The method of claim 4 further including the steps of:
   (o) sensing the number of requests additionally queued; and
   (p) initiating said step (m) of scanning when the number of additionally queued requests exceeds a second predetermined maximum.

6. The method of claim 1 further including the steps of:
   (q) additionally queuing for a second fixed time period each request remaining unconnected after said step (g) of scanning;
   (r) scanning said first group of said communication links for availability of one of the communication links therein in response to said step (q) of additionally queuing;
   (s) connecting the calling station associated to the oldest additionally queued request to one of said communication links in said first group, if available;
   (t) scanning said second group of said communication links for availability of one of the communication links therein if none of said communication links in said first group was available during said step (n) of scanning;
   (u) connecting the calling station associated to the oldest additionally queued request to one of said communication links in said second group, if available; and
   (v) repeating said steps (r), (s), (t), and (u).

7. The method of claim 6 further including the steps of:
   (w) scanning a third group of communication links for availability of one of the communication links therein when a request has been additionally queued for said second fixed time period; and
   (x) connecting the calling station associated to the oldest additionally queued request to one of said communication links in said third group.

8. The method of claim 7 further including the steps of:
   (y) sensing the number of requests additionally queued; and
   (z) initiating said step (w) of scanning when the number of additionally queued requests exceeds a second predetermined maximum.

9. A queuing system for use with a plurality of calling stations and a plurality of ordered groups of communication links, each group having a different priority level, such system comprising:
   first sensing means adapted to be coupled to said calling stations for sensing communication link request signals from said calling stations;
   first scanning means for scanning a first group of said communication links to determine the availability of a communication link therein;
   first switching means for connecting the calling station associated to a given request signal to one of said communication links in said first group, when available;
   first queuing means for storing said request signals for a predetermined first time period when none of said communication links in said first group is available;
   means for determining the number of request signals stored in said first queuing means;
   second scanning means for scanning a second group of said communication links to determine availability of a communication link therein when a request signal has been stored in said first queuing means for said first time period or the number of request signals stored in said first queuing means exceeds a first predetermined number; and second switching means for connecting the calling station associated to the oldest request signal stored in said first queuing means to one of said communication links in said second group.

10. The system of claim 9 further including third scanning means for scanning a third group of communication links for availability of one of the communication links therein when said second scanning means determines the unavailability of any of said communication links in said second group, and third switching means for connecting the calling station associated to the oldest request signal stored in said first queuing means to one of said communication links in said third group.

11. The system of claim 9 further including second queuing means for storing request signals for a predetermined second fixed time period, means for transferring the oldest request signal stored in said first queuing means to said second queuing means when said second scanning means determines the unavailability of a communication link in said second group, and means responsive to the transfer of a request signal to said second queuing means for activating said second scanning means.

12. The system of claim 11 further including third scanning means for scanning a third group of communication links for availability of one of the communication links therein when a request signal has been stored in said second queuing means for said second fixed time period, and third switching means for connecting the calling station associated to the oldest request signal stored in said second queuing means to one of said communication links in said third group.

13. The system of claim 12 further including means for determining the number of request signals stored in said second queuing means, and means for activating said third scanning means when the number of request signals stored in said second queuing means exceeds a second predetermined number.

14. The system of claim 9 further including third queuing means for storing request signals for a predetermined second fixed time period, means for transferring the oldest request signal stored in said first queuing means to said third queuing means when said second scanning means determines the unavailability of a communication link in said second group, and means responsive to the transfer of a request signal to said third queuing means for sequentially activating said first scanning means and said first switching means to connect the calling station associated to the oldest request signal stored in said third queuing means to one of said communication links in said first group, if available, and for subsequently activating said second scanning means and said second switching means if none of said communication links in said first group is available to connect the calling station associated to the oldest request signal stored in said third queuing means to one of said communication links in said second group.

15. The system of claim 14 further including third scanning means for scanning a third group of communication links for availability of one of the communication links therein when a request signal has been stored in said third queuing means for said second fixed time period, and third switching means for connecting the calling station associated to the oldest request signal stored in said third queuing means to one of said communication links in said third group.

16. The system of claim 15 further including means for determining the number of request signals stored in said third queuing means, and means for activating said third scanning means when the number of request signals stored in said third queuing means exceeds a third predetermined number.

* * * * *